United States Patent
Orthman

[11] 3,718,103
[45] Feb. 27, 1973

[54] SEEDED SPLITTER AND SHAPER

[75] Inventor: Henry K. Orthman, Lexington, Nebr.

[73] Assignee: Orthman Manufacturing Inc., Lexington, Nebr.

[22] Filed: Jan. 6, 1971

[21] Appl. No.: 104,405

[52] U.S. Cl. .................. 172/159, 37/98, 172/642, 172/722
[51] Int. Cl. .............................................. A01b 13/02
[58] Field of Search......172/155, 159, 722, 723, 730, 172/733, 642, 686; 37/98

[56] References Cited

UNITED STATES PATENTS

| 2,764,924 | 10/1956 | Degge | 172/722 |
| 437,595 | 9/1890 | Hedges | 172/723 |
| 3,563,317 | 2/1971 | Sprick | 37/98 |
| 1,848,635 | 3/1932 | Leriche et al. | 37/98 |
| 295,189 | 3/1884 | Meador | 172/159 |
| 229,484 | 6/1880 | Stanchfield | 172/159 |
| 316,403 | 4/1885 | Schroeder | 172/722 |
| 932,256 | 8/1909 | Estabrook | 172/722 |
| 1,334,855 | 3/1920 | Hammond | 172/722 |
| 1,551,350 | 8/1925 | Ward | 172/159 |
| 3,068,595 | 12/1962 | Winn | 172/159 |

FOREIGN PATENTS OR APPLICATIONS 250,197  2/1964  Netherlands..........................172/730

Primary Examiner—Robert E. Bagwill
Assistant Examiner—C. W. Hanor
Attorney—Zarley, McKee & Thomte

[57] ABSTRACT

A tool bar having a plurality of spaced apart ground working assemblies including a furrowing shovel with outwardly and rearwardly extending vertically adjustable mold boards on opposite sides thereof. The outer ends of the mold boards have an upper convex forwardly rounded surface and a rear edge which extends forwardly and downwardly and meets at a vertex with upwardly and longitudinally inwardly extending rear edge on a cutting blade extending along the bottom of the mold board. The mold boards are supported independently of the furrowing shovel and the outer ends of adjacent mold boards are closely spaced to form a ridge such that seed is planted on a ledge between the valley formed by the furrowing shovel and the ridge formed by adjacent mold boards.

7 Claims, 9 Drawing Figures

PATENTED FEB 27 1973 3,718,103
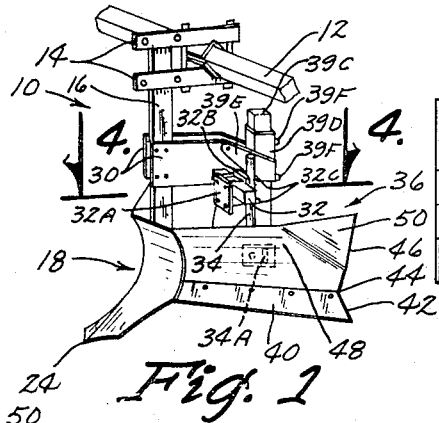
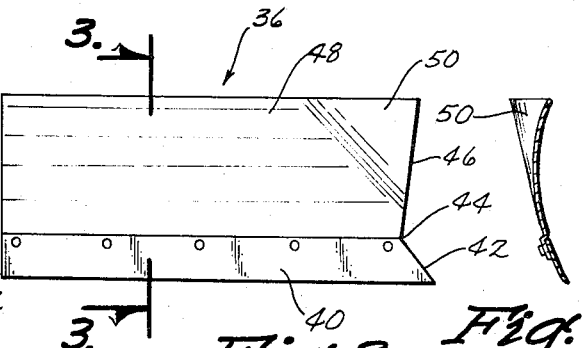
Fig. 1  Fig. 2  Fig. 3
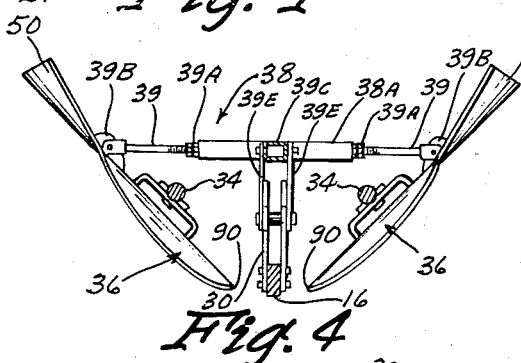
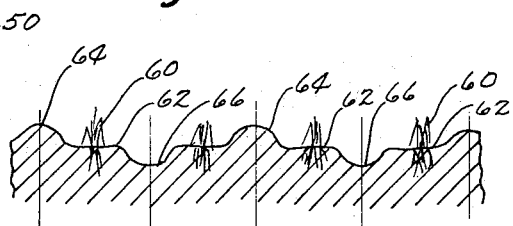
Fig. 4  Fig. 5
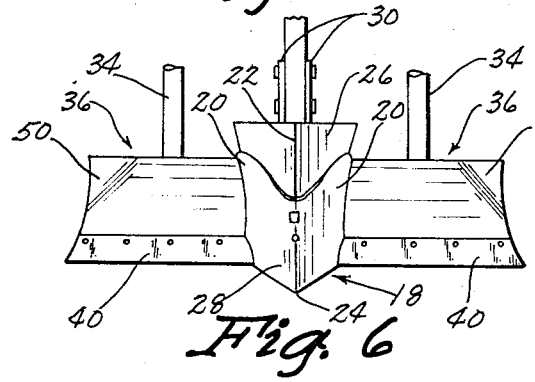
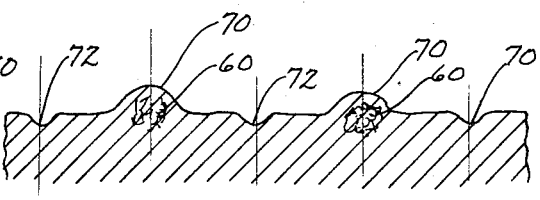
Fig. 6  Fig. 7
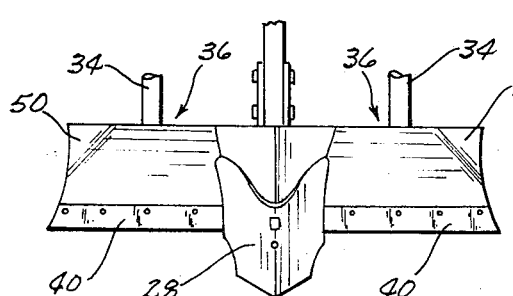
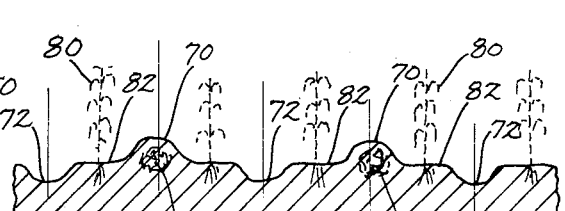
Fig. 8  Fig. 9
INVENTOR
HENRY K. ORTHMAN
BY
Zarley, McKee & Thomte
ATTORNEYS

SEEDED SPLITTER AND SHAPER

The typical ground preparation for planting of corn involves use of a conventional plow followed by disking, harrowing and planting. A generally level bed surface is used. In areas where irrigation is necessary it has been found that the seedbed splitter and shaper of this invention provides a more preferred and suitable seedbed which includes an irrigation trough or valley below a ledge for planting seed which in turn is below a ridge of turned over crop from the previous season. The next season the seedbed sequence is reversed such that a ridge is formed in the valley and a valley is formed in place of each of the ridges with the seed being planted between the valley and the ridges. First, a bed splitter is passed over the soil after the cornstalks have been chopped by a cornstalk chopper or the like and then this is followed by the same seedbed preparation machine which functions then as a seedbed shaper in final preparation for the planting of the seed. The seedbed shaper differs from the seedbed splitter by the rearwardly and outwardly extending mold boards on opposite sides of the furrowing shovel being located lower on the splitter than on the shaper.

The forming of the ridges between the trailing ends of the mold boards of each of the ground working assemblies, makes it necessary to place the trailing edges close together and a resulting problem is the gathering of cornstalk trash as opposed to the formation of a smooth and rounded ridge of turned over soil. The specific shape of the mold board and cutting blade of the oppositely disposed mold boards of each ground working assembly has overcome this problem and results in a smooth rounded ridge between each seed ledge. The outer edge of the blade angles upwardly and longitudinally inwardly and meets the lowermost point on the mold board which extends from there upwardly and longitudinally outwardly. The upper rear corner of the mold board is rounded to form a convex forwardly surface which allows the soil and stock debris cut by the cutting blade to flow smoothly along and over the mold board to form the nicely rounded ridge and eliminate the problem of debris gathering between adjacent outer ends of mold boards and clogging up the implement.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of a ground working assembly of this invention;

FIG. 2 is a front elevational view of the mold board of the ground working assembly;

FIG. 3 is a cross sectional view taken along line 3 — 3 in FIG. 2;

FIG. 4 is a top plan view of the oppositely disposed and extending mold boards in the ground working assembly;

FIG. 5 illustrates the seedbed after harvesting and prior to being worked by the bed splitter;

FIG. 6 is a front elevational view of the ground working assembly with the oppositely disposed mold board's position lower for the unit to function as a bed splitter;

FIG. 7 illustrates the seedbed in cross section after the bed splitter of FIG. 6 has worked the ground illustrated in FIG. 5;

FIG. 8 is a front elevational view similar to FIG. 6 but illustrating the mold boards in a raised position for the ground working unit to function as a bed shaper; and FIG. 9 is a cross sectional view of the bed contour after the bed shaper of FIG. 8 has worked the ground of FIG, 7.

The seedbed splitter and shaper of this invention is referred to generally in FIG. 1 by the reference numberal 10 and is shown carried on a tool bar 12 and held in place by horizontally disposed clamping members 14 which are adjustable to position the unit in the desired position. It is understood that a series of units of this design will be carried on the tool bar 12 to work the ground and prepare the seedbed.

A shank 16 extends downwardly from the members 14 and carries at its lower end a furrowing shovel 18 having a concave forward face with rearwardly extending wings 20 converging along a vertical centerline 22 and providing a pointed lower end 24. The shovel 18 includes an upper section 26 which functions as a trash shield in cooperation with the lower blade portion 28 as seen in FIG. 6.

A pair of rearwardly extending plates 30 are connected to the shank 16 and support at their rear end a cross member 32 having downwardly extending shanks 34 detachably connected thereto. A pair of oppositely disposed mold board units 36 are carried on the lower ends of the shanks 34 and are interconnected by an extendable cross member 38 which includes a female member 38A having oppositely extending threaded male members 39 adjustably locked in place by lock nuts 39A. The ends of the male members 39 are pivotally connected to ears 39B on the back side of the mold board units 36. An upstanding rectangular in cross section post 39C is provided on the female cross member 38A and is telescopically received in a sleeve 39D pivotally connected by forwardly extending ears 39E to the rearwardly extending plates 30. A pair of set screws 39F are provided along the far edge of the sleeve 39D in order to bear directly against a side wall of the upstanding post 39C and thereby more positively maintain the post in place.

The connection of the upstanding post 34 to the cross members 32 includes front and rear bearing or clamping plates 32A and 32B, respectively, held together on opposite sides of the cross member 32 by top and bottom U-bolts 32C. The mold board units 36 include a detachable blade 40 which has a rear edge 42 extending longitudinally inwardly and upwardly to a vertex point 44 where the rear edge 46 of the mold board section 48 merges. This rear edge 46 extends downwardly and longitudinally inwardly such that a V-shaped notch is formed in the rear edge of the mold board unit. The upper rear corner 50 of the mold board is convex forwardly as seen in FIGS. 2 and 3.

In general the procedure followed in preparing a seedbed by the use of the splitter and shaper unit of this invention is that after the corn has been harvested the stocks are cut by a shredding machine and then the splitter is used on the ground as seen in FIG. 6 wherein the mold board units 36 are lowered vertically relative to the furrowing shovel 18. The stocks of corn 60 in FIG. 5 on the seed ledges 62 between the ridges 64 and the irrigation troughs or valleys 66, are sheared off and moved over to the area of the troughs and thus new ridges 70 are formed as seen in FIG. 7 with new troughs 72 in line with the former ridges 64. Next the bed shaper, as seen in FIG. 8, is used and the shaper differs from the splitter by the fact that the mold board units 36 have been raised. During the shaping operation a planter unit also seeds the soil with corn seed which will produce a new crop of corn 80 on the ledge 82 between the troughs 72 and the ridges 70. The adjustment between the splitter and shaper arrangements in FIGS. 6 and 8 is easily accomplished by the shanks 34 being adjustably connected to the cross member 32, as seen in FIG. 1.

It is understood that as the splitter or shaper unit moves through the ground it is accompanied by a series of units in side by side relationship such that the ridges 70 are formed by the adjacent ends of the mold boards 36. It is necessary to form these ridges 70 but it is only possible to smoothly form them if the configuration of the outer edge of the mold board is as shown in FIGS. 2 and 3 wherein the upper rear corner 50 is convex forwardly and the rear edge is V-shaped with the blade 40 having the edge 42 tapering longitudinally inwardly and upwardly and being met by the downwardly and longitudinally inwardly tapering mold board rear edge. This allows the trash to smoothly roll off of the mold board and not pile up between adjacent mold boards. Also, a smooth and not ragged ledge 82 is provided which makes the planting operation much simpler.

It is seen in FIG. 2 that the rearmost point in the upper rear corner of the mold board 48 is in a vertical plane longitudinally inwardly of the rearmost point on the rear edge 42 of the blade 40.

It is seen that the support structure for the mold boards 36 provides unlimited adjustability. The mold boards may be readily lowered or raised by adjusting the U-bolts 32C on the upstanding posts 34 along with similar adjustment being made through the set screws 39F engaging the upstanding posts 39C. The angularity of the rearwardly extending mold boards relative to the ground may be varied due to the ability of them to pivot on the upstanding post 39C pivotally connected to the rearwardly extending plates 30. A pair of bolts connect the lower end of the upstanding post 34 to the mold board units 36 and the rearmost bolt opening 34A is elongated vertically to permit the pivotal movement. The angularity between the rearwardly extending mold board units 36 may be varied by extending or retracting the male threaded members 39 relative to the female cross member 38A. It is seen that this three point connection of the two mold board units 36 to the tool bar frame member 12 gives maximum strength and adjustability without any connection being made between the forward ends 90 to the furrowing shovel 18. Instead the forward ends 90 are merely positioned behind the rearwardly extending furrowing shovel wings 20.

I claim:

1. A farm implement having a tool bar, a plurality of ground working assemblies secured to said tool bar along its lengths, each of said ground working assemblies including a furrowing shovel and outwardly and rearwardly extending mold boards on each side thereof, said mold boards being adjustable independently of said furrowing shovel and each other, the outer free end of adjacent mold boards being closely spaced to form an ridge of soil therebetween with seed row ledges being formed between the valley formed by said furrowing shovel and the ridges formed by adjacent mold boards, said mold boards having forward vertical edges which are positioned inwardly and forwardly of the outer vertical rear edges of said furrowing shovel, said furrowing shovel being supported on a downwardly extending primary shank connected to said tool bar, a rearwardly extending arm connected to said shank, a cross member extending horizontally in opposite directions from said arm, secondary shanks vertically adjustably connected to said cross members and connected to said mold boards at their lower ends, a vertically extending and adjustable post being provided on said arm rearwardly of said cross members, and an adjustably extendable cross member on the lower end of said post and connected at its outer ends to said mold boards, wherein said rearwardly extending arm is further defined as being a pair of spaced apart plates and said cross members are connected to the adjacent plate, and said post is secured between said plates.

2. The structure of claim 1 wherein each of said mold boards includes a cutting blade along its lower longitudinal edge and the rear end of said cutting blade includes an edge which extends sharply longitudinally inwardly and upwardly from the bottom of the blade and converges with an upper mold board section which extends downwardly and inwardly from its upper longitudinal edge.

3. The structure of claim 2 wherein the upper rear corner of said mold board section is convex forwardly.

4. The structure of claim 3 wherein the substantial length of said mold board is concave forwardly in vertical cross section.

5. The structure of claim 4 wherein said cutting blade is detachably secured to said mold board section.

6. The structure of claim 1 wherein said furrowing shovel includes rearwardly and outwardly extending wings and the width of said shovel increases from its lowermost point upwardly.

7. The structure of claim 1 wherein said upstanding post is rectangular in cross section and is received in a similarly shaped sleeve, and a set screw is carried on said sleeve for engagement with the edge of a side wall of said upstanding post to lock said upstanding post to said sleeve, said sleeve being pivotally connected to said member.

* * * * *